United States Patent [19]
Oana et al.

[11] Patent Number: 5,282,054
[45] Date of Patent: Jan. 25, 1994

[54] FACSIMILE EQUIPMENT HAVING DIFFERENT OPERATIONS WITH DIFFERENT POWER SOURCES

[75] Inventors: Masao Oana; Yasuichi Kishino; Hiromi Ichikawa, all of Shizuoka, Japan

[73] Assignee: Tokyo Electric Co., Ltd., Tokyo, Japan

[21] Appl. No.: 883,211

[22] Filed: May 14, 1992

[30] Foreign Application Priority Data

May 16, 1991 [JP] Japan .................................. 3-111672
May 31, 1991 [JP] Japan .................................. 3-129113

[51] Int. Cl.⁵ ............................................. H04N 1/32
[52] U.S. Cl. .................................. 358/406; 358/434; 358/442; 358/468
[58] Field of Search ............... 358/406, 437, 434, 405, 358/409, 436, 442, 468; 455/127, 343, 345, 38.3, 89; 320/15; 379/100

[56] References Cited

U.S. PATENT DOCUMENTS 5,036,532  7/1991  Metroka et al. .
5,162,721  11/1992  Sato .................................. 320/15

FOREIGN PATENT DOCUMENTS 63-275259  11/1988  Japan .
64-19862    1/1989  Japan .

*Primary Examiner*—Edward L. Coles, Sr.
*Assistant Examiner*—Scott A. Rogers
*Attorney, Agent, or Firm*—Oblon, Spivak, McClelland, Maier & Neustadt

[57] ABSTRACT

A portable facsimile equipment having a plurality of power source connecting portions adapted to be selectively connected to plural kinds of power sources. The facsimile equipment is operable in correspondence with the kind of power source connected thereto. A power source kind detector detects the kind of power source connected. A communication mode storing device stores a communication mode corresponding to the power source connected. A communication mode selecting device accesses the communication mode stored in the communication mode storing device according to a signal from the power source kind detector to automatically set the communication mode. A compact battery can be detachably fixed as one of the power sources. An AC power source can be detachably fixed as one of the power sources. A DC power source can also be detachably fixed as one of the power sources.

8 Claims, 7 Drawing Sheets (STMILARLY SELECT TO SET)

FACSIMILE EQUIPMENT HAVING DIFFERENT OPERATIONS WITH DIFFERENT POWER SOURCES

FIELD OF THE INVENTION AND RELATED ART STATEMENT

The present invention relates to a portable, compact and light facsimile equipment operable by a multi-power source such as an AC power source provided in an office or the like, a relatively large-sized DC power source mounted on an automobile or the like, and a compact battery power source suitable for portability, so as to effect communication from the office, the automobile, or a telephone at the place which one visits or a public telephone in the road.

There is known a compact and light facsimile equipment operable by a multi-power source such as an AC power source, a DC power source and a compact battery power source, so as to diversify a mode of use of the facsimile equipment. However, although such a facsimile equipment can be used with any one of these power sources, a specification such as a function and operational characteristics of the facsimile equipment is common with respect to all the power sources.

In the case of using the AC power source, there is no specific problems because a source capacity is large and the facsimile equipment is designed so as to standardize the use of the AC power source.

In the case of using the DC power source, however, the facsimile equipment is used mostly in an automobile. In most cases, the facsimile equipment is operated by a battery mounted in the automobile as the power source in connection with a mobile telephone (cellular telephone). In this case, there is a problem in communication such that a telephone line condition is relatively bad to cause the occurrence of communication error many times.

In the case of using the compact battery power source suitable for portability, the facsimile equipment is usually used in connection with a telephone at the place which one visits or a public telephone on the road. In this case, since a battery capacity is small, there is a problem such that the battery becomes dead during the operation of the facsimile equipment, so that timer transmission for transmitting data previously stored in a memory provided in the facsimile equipment at a preset start time cannot be performed to result in unsatisfaction of an operator.

Further, it is known that a rechargeable battery as the compact battery power source is detachably mounted to the facsimile equipment. In this case, even when the rechargeable battery mounted becomes dead, it may be replaced by a preparatory rechargeable battery to enable the facsimile equipment to be continuously used. In such a facsimile equipment, selection of the use of the rechargeable battery or the use of an external power source is carried out by manually operating a select switch. Further, the dead rechargeable battery is removed from the facsimile equipment and it is charged by using a special charger.

In such a facsimile equipment operable by a multi-power source, the selection of the power source to be used and the charging of the rechargeable battery must be manually carried out to cause troublesomeness.

OBJECT AND SUMMARY OF THE INVENTION

It is a first object of the present invention to adapt a specification such as a function and operational characteristics of a facsimile equipment according to the kind of the power source selected.

It is a second object of the present invention to automatically select a suitable power source.

It is a third object of the present invention to automatically charge a rechargeable battery.

According to the present invention, there is provided a portable facsimile equipment having a plurality of power source connecting portions adapted to be selectively connected to plural kinds of power sources, the facsimile equipment being operable in correspondence with the kind of the power source connected; the portable facsimile equipment comprising:

(a) power source kind detecting means for detecting the kind of the power source connected;

(b) communication mode storing means for storing a communication mode corresponding to the power source connected;

(c) communication mode selecting means for accessing the communication mode stored in the communication mode storing means according to a signal from the power source kind detecting means to automatically set the communication mode; and (d) battery means for detachably fixing a compact battery as one of the power sources. Accordingly, the specification such as a communication speed and a short break allowable time may be suitably changed to be set according to the power source connected to the facsimile equipment, thereby allowing the operator to use the facsimile equipment with the specification optimal to the power source connected. Thus, the communication error can be eliminated, and the operator can use the facsimile equipment in accordance with his intention.

DETAILED DESCRIPTION OF THE PREFERRED EMBODIMENTS

Figure 1:
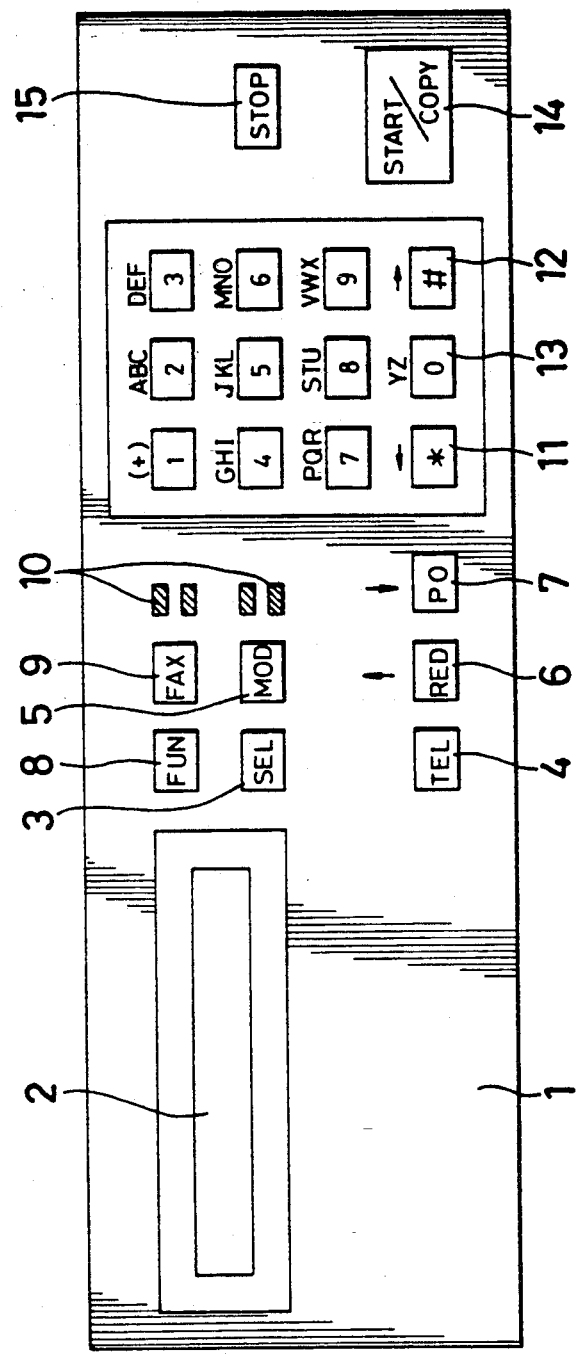
FIG. 1 is a plan view of an operation panel of a facsimile equipment according to a first preferred embodiment of the present invention.

A first preferred embodiment of the present invention will be described with reference to FIGS. 1 to 5. Referring now to FIG. 1, reference numeral 1 generally designates an operation panel of a facsimile equipment. The operation panel 1 is provided at its left upper position with a display portion 2 of an LCD (Liquid Crystal Display). There are provided, on the right-hand side of the display portion 2, a select key 3, a TEL key 4, a mode key 5, a redial/↑ key 6, a pose/↓ key 7, a function key 8, a FAX key 9, and four status indication LEDs 10. There are further provided in the right-hand side of these keys a */←key 11, a #/→ key 12, and a dialing numeral key 13 consisting of ten (0 to 9) keys. There are further provided, on the right-hand side of the dialing numeral key 13, a start/copy key 14 and a stop key 15.

The facsimile equipment is provided with power source kind detecting means for detecting which of an AC power source, a DC power source and a compact battery power source is used with the facsimile equipment. The power source kind detecting means is realized by providing a mechanical switch (not shown) for detecting insertion of a plug into a jack in a power input adapter portion and reading a signal from the mechanical switch through an I/0 port to a CPU. When the kind of the power source connected to the facsimile equipment is detected by the power source kind detecting means, a software program is changed according to the kind of the power source in the following manner.

In the case of using the AC power source, the facsimile equipment is operated in a normal condition (e.g., at a communication speed of 9600 bps) without any specific problems since the facsimile equipment is designed to standardize the use of the AC power source. Accordingly, a change in specification is not particularly carried out.

In the case of using the DC power source, the facsimile equipment is generally connected to a mobile telephone as mentioned above. As known in the art, the mobile telephone communicates with a base station by radio. During movement of the automobile, the nearest base station is sequentially selected, and a communication line is switched. Accordingly, a communication condition is bad, and short breaks occur upon switching of the communication line. In these circumstances, if the facsimile equipment is operated at the same communication speed (9600 bps) and under the same short break condition (break of communication for a predetermined period of time is processed as communication error) as that in the case where it is directly connected to a telephone line with use of an AC power source provided in an office or the like, many errors are generated in the communication data, and communication error due to short breaks occur many times, so that the facsimile equipment cannot be practically used in most cases. To cope with this, in the case of using the DC power source, the communication speed is automatically lowered to 7200 bps or 4800 bps, and the short break condition is automatically changed so that a period of time for determination of the communication error is extended. Then, the specification thus changed is stored into specification storing means (communication mode storing means), and it is accessed by specification selecting means (communication mode selecting means) according to a signal from the power source kind detecting means, which signal represents that the DC power source is connected to the facsimile equipment. Thus, the specification of the facsimile equipment is automatically set to an optimal condition for practical use in the case of using the DC power source.

In the case of using the compact battery power source, there occurs a problem relating to a battery capacity. The use of the battery power source connotes that the facsimile equipment is to be carried, so that it is necessary to make the battery as small and light as possible, so as to easily carry the facsimile equipment. As a result, it is obliged to make the battery capacity small. Accordingly, it is anticipated that the battery becomes dead in the course of communication. Furthermore, timer transmission is often carried out in the facsimile equipment. In this case, if other communication data is received by the facsimile equipment before a preset start time for the timer transmission, the battery capacity is consumed to cause the death of the battery, resulting in the problem that the intended communication data to be transmitted by the timer transmission cannot be transmitted. To cope with this, the specification is changed so that automatic receiving is inhibited until the timer transmission is ended, or so that a warning that the battery power source is used is given to an operator upon setting of the timer transmission and the timer transmission is inhibited in this case. Then, the specification thus changed is stored into the specification storing means, and it is accessed by the specification selecting means according to a signal from the power source kind detecting means, which signal represents that the battery power source is connected to the facsimile equipment. Thus, the specification of the facsimile equipment is automatically set to an optimal condition for practical use in the case of using the compact battery power source.

Figure 2:
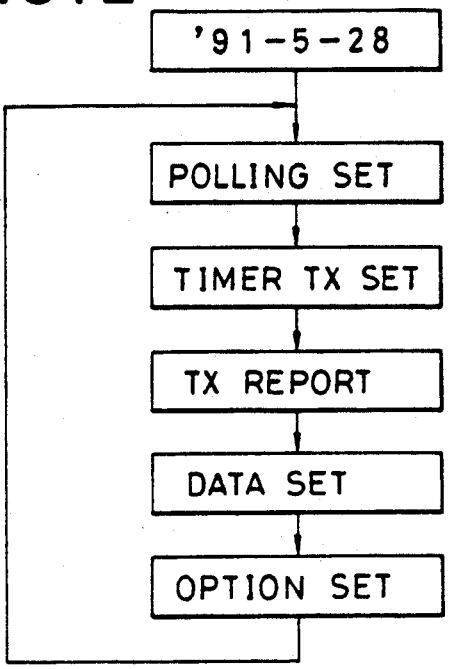
FIG. 2 is a flowchart illustrating a procedure of mode setting.
Figure 3:
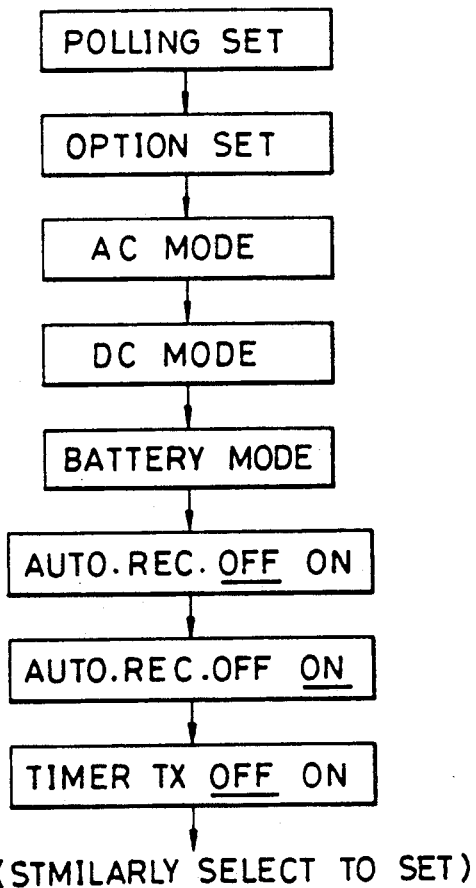
FIG. 3 is a flowchart illustrating a procedure of parameter setting.

Further, in addition to such automatic setting of the specification according to the kind of the power source, there is a case where the operator intends to manually change the specification. For example, in the case where the automobile is stopped near a base station considered to provide a relatively good communication condition and the communication is carried out with use of the mobile telephone, it is desirable to set the communication speed to a high speed (9600 bps) because the communication is effected with no error in a short time. Accordingly, it is necessary to change the specification for the DC power source into the specification similar to that for the AC power source. An example of such specification change, that is, an example of parameter setting is illustrated in FIGS. 2 and 3. Referring first to FIG. 2, in a stand-by condition, the date or time such as "'91-5-28" is displayed on the display portion 2. When the function key 8 is depressed in this condition, the message of "POLLING SET" is displayed on the display portion 2, and a polling stand-by condition is set.

When the function key 8 is depressed again in this condition, the message of "TIMER TX SET" is displayed on the display portion 2, and a timer transmission stand-by condition is set. In this mode, a start time for timer transmission can be set.

When the function key 8 is depressed again in this condition, the message of "TX REPORT" is displayed on the display portion 2. In this mode, a transmission/receiving record, an abbreviated dial list, an option set condition or list, etc. can be output as a printed report.

When the function key 8 is depressed again in this condition, the message of "DATA SET" is displayed on the display portion 2. In this mode, various data such as date, telephone number for abbreviated dial, password, ID number and name can be set.

When the function key 8 is depressed again in this condition, the message of "OPTION SET" is displayed on the display portion 2. In this mode, an optional function can be selected and set.

When the function key 8 is depressed again in this condition, the polling set mode mentioned above is restored.

In this manner, a desired one of these various modes can be selected. An example of optional function setting in the option set mode is illustrated in FIG. 3. Referring to FIG. 3, the option set mode is first set in the manner as mentioned above. When the select key 3 is depressed in this mode, a desired one of various modes such as AC mode, DC mode, battery mode, automatic receiving mode (AUTO REC OFF ON) and timer transmission mode (TIMER TX OFF ON) can be sequentially selected. When the desired mode is accessed by depressing the select key 3 and the start/copy key 14 is then depressed, this mode is selected to allow the operator to set desired parameters. Thereafter, when the stop key 15 is depressed, the display of the date on the display portion 2 is restored.

Figure 4:
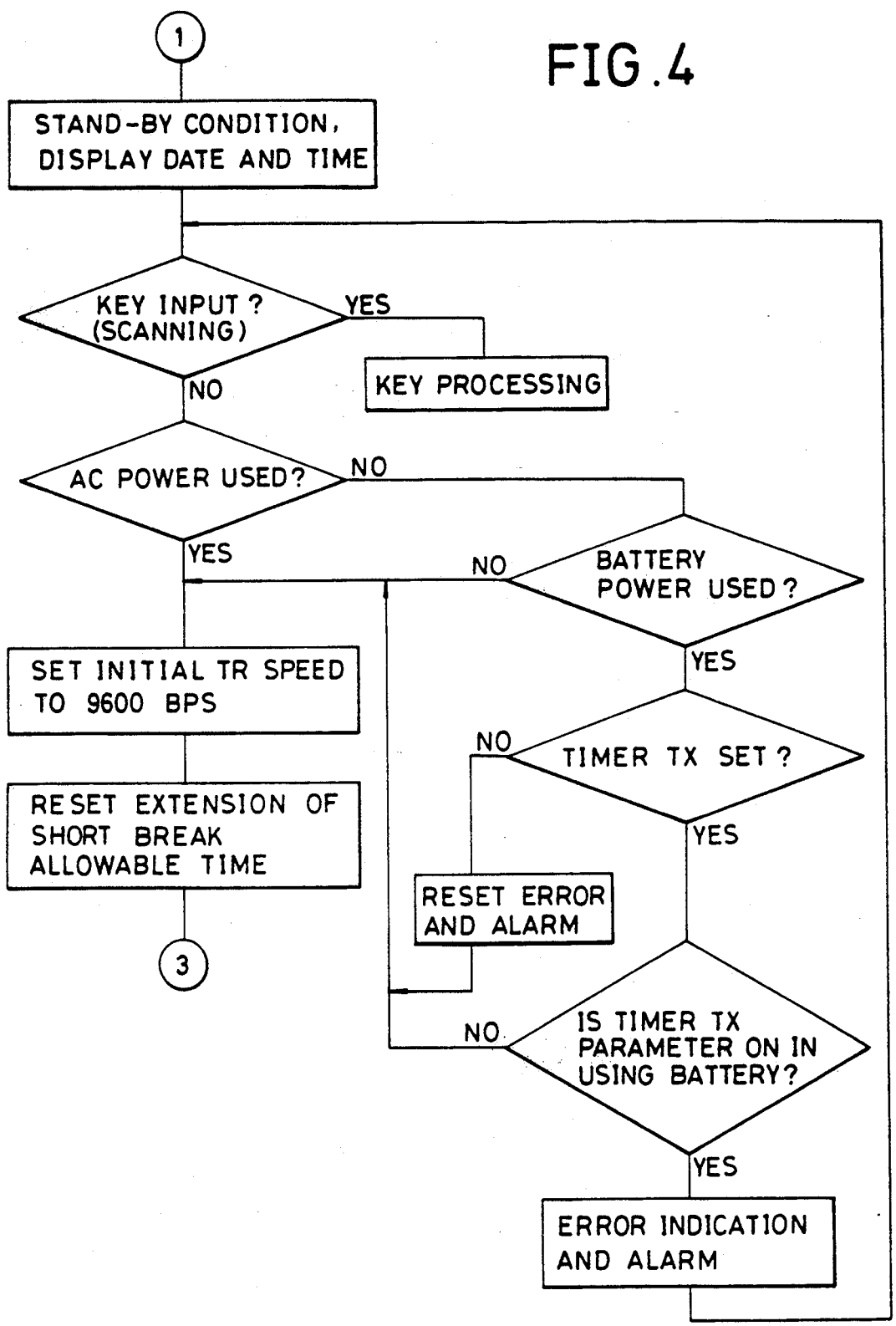
FIGS. 4 and 5 are flowcharts illustrating transmitting and receiving operations of the facsimile equipment.

Now, the operation of the first preferred embodiment will be described with reference to the flowchart shown in FIGS. 4 and 5. Referring to FIG. 4, in a stand-by condition, key scanning is carried out, and if any key is depressed, key processing according to the key input is carried out.

If no key is depressed, the power source kind detecting means detects whether or not the AC power source is now in use. If the AC power source is now in use, an initial communication speed is set to 9600 bps, and the extension of a short break allowable time is reset if it is now extended.

Figure 5:
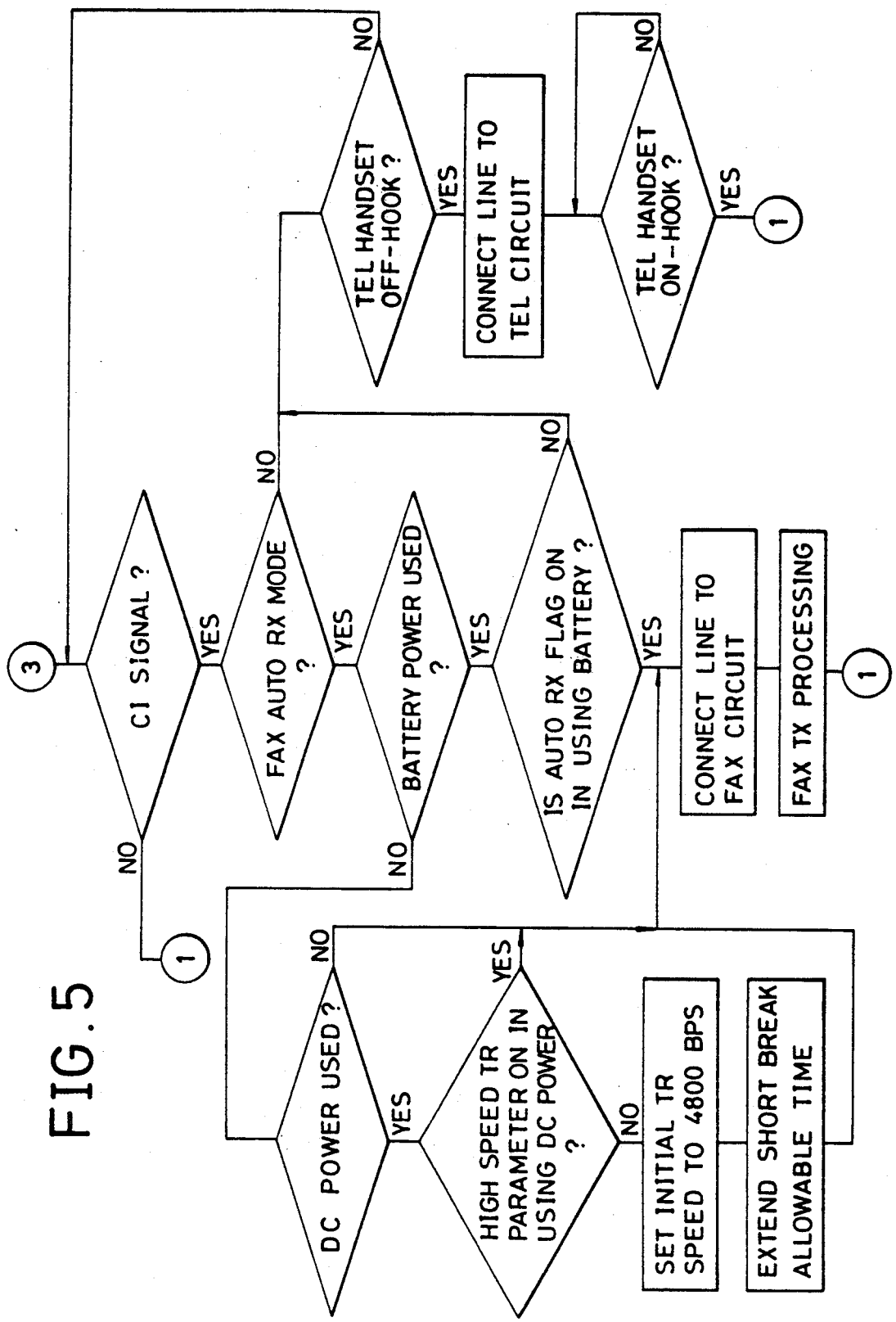

Referring next to FIG. 5, if a telephone call (CI signal) is detected, then it is checked whether or not an automatic receiving mode is now ON. If the automatic receiving mode is now ON, and if neither the battery power source nor the DC power source is now in use, the line is connected to a facsimile circuit to perform receive processing.

If the DC power source is now in use, and if a high-speed communication parameter in the case of using the DC power source is now OFF, the initial communication speed is set to 4800 bps, and the short break allowable time is extended. Then, the line is connected to the facsimile circuit to perform the receive processing. If the high-speed communication parameter in the case of using the DC power source is now ON, the receive processing is performed at the high communication speed of 9600 bps in the same manner as the case of using the AC power source.

If the battery power source is now in use, and if an automatic receiving flag in the case of using the battery power source is now ON, the line is connected to the facsimile circuit to perform the receive processing. If the automatic receiving flag in the case of using the battery power source is now OFF, or if the automatic receiving mode is now OFF, the line is connected to a telephone circuit by bringing a telephone handset into an off-hook condition. Then, the telephone handset is brought into an on-hook condition to restore the start of the program.

Referring back to FIG. 4, if the AC power source is not now in use, and if the battery power source is not now in use, the initial communication speed is set to 9600 bps, and the extension of the short break allowable time is reset if it is now extended.

If the battery power source is now in use, and if a timer transmission mode is now OFF, neither error display nor alarm is reset. Then, the initial communication speed is set to 9600 bps, and the extension of the short break allowable time is reset if it is now extended.

If the battery power source is now in use, and if a timer transmission parameter in the case of using the battery power source is now OFF, the initial communication speed is set to 9600 bps, and the extension of the short break allowable time is reset if it is now extended.

If the battery power source is now in use, and if the timer transmission parameter in the case of using the battery power source is now ON, both the error display and the alarm are performed.

As described above, the facsimile equipment according to the first preferred embodiment includes the power source kind detecting mean for detecting the kind of the power source such as AC power source, DC power source and battery power source, the specification storing means for storing the specification corresponding to the power source connected to the facsimile equipment, and the specification selecting means for accessing the specification stored in the specification storing means according to a signal from the power source kind detecting mean to set the specification. Accordingly, the specification such as a communication speed and a short break allowable time may be suitably changed to be set according to the power source connected to the facsimile equipment, thereby allowing the operator to use the facsimile equipment with the specification optimal to the power source connected. Thus, the communication error can be eliminated, and the operator can use the facsimile equipment in accordance with his intention.

Figure 7:
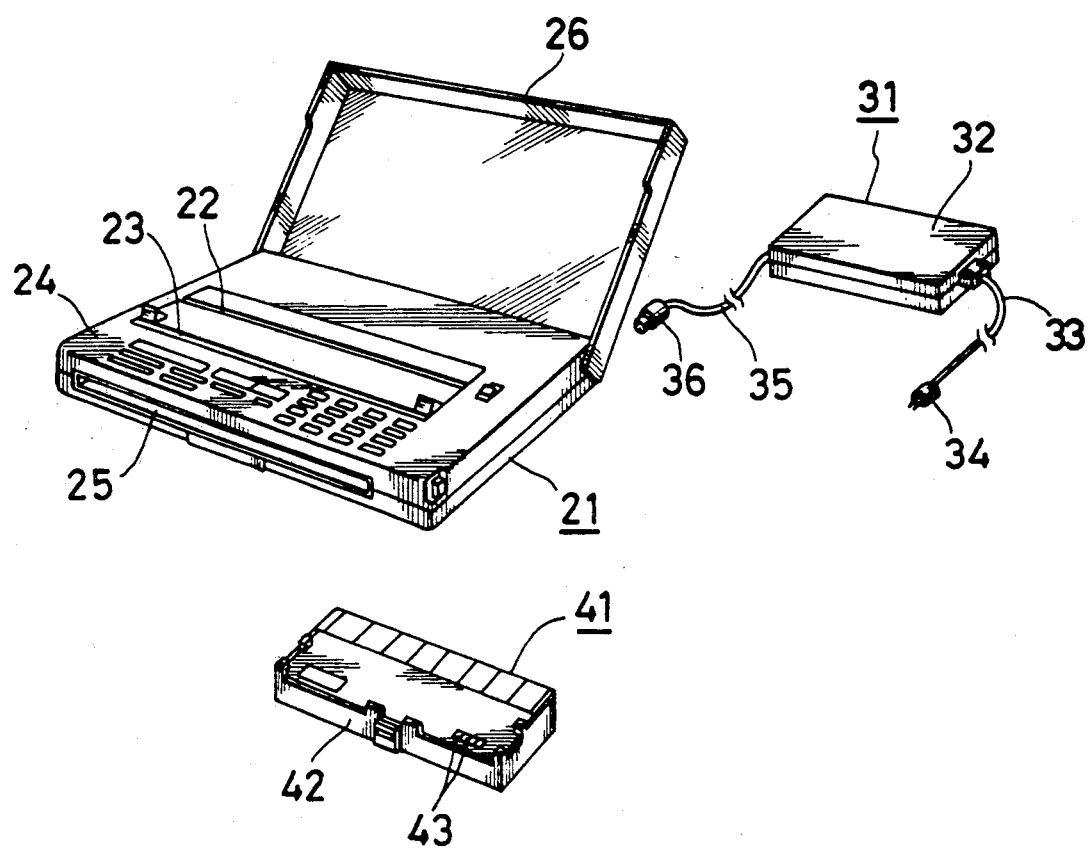
FIG. 7 is a perspective view of the facsimile equipment according to the second preferred embodiment.
Figure 8:
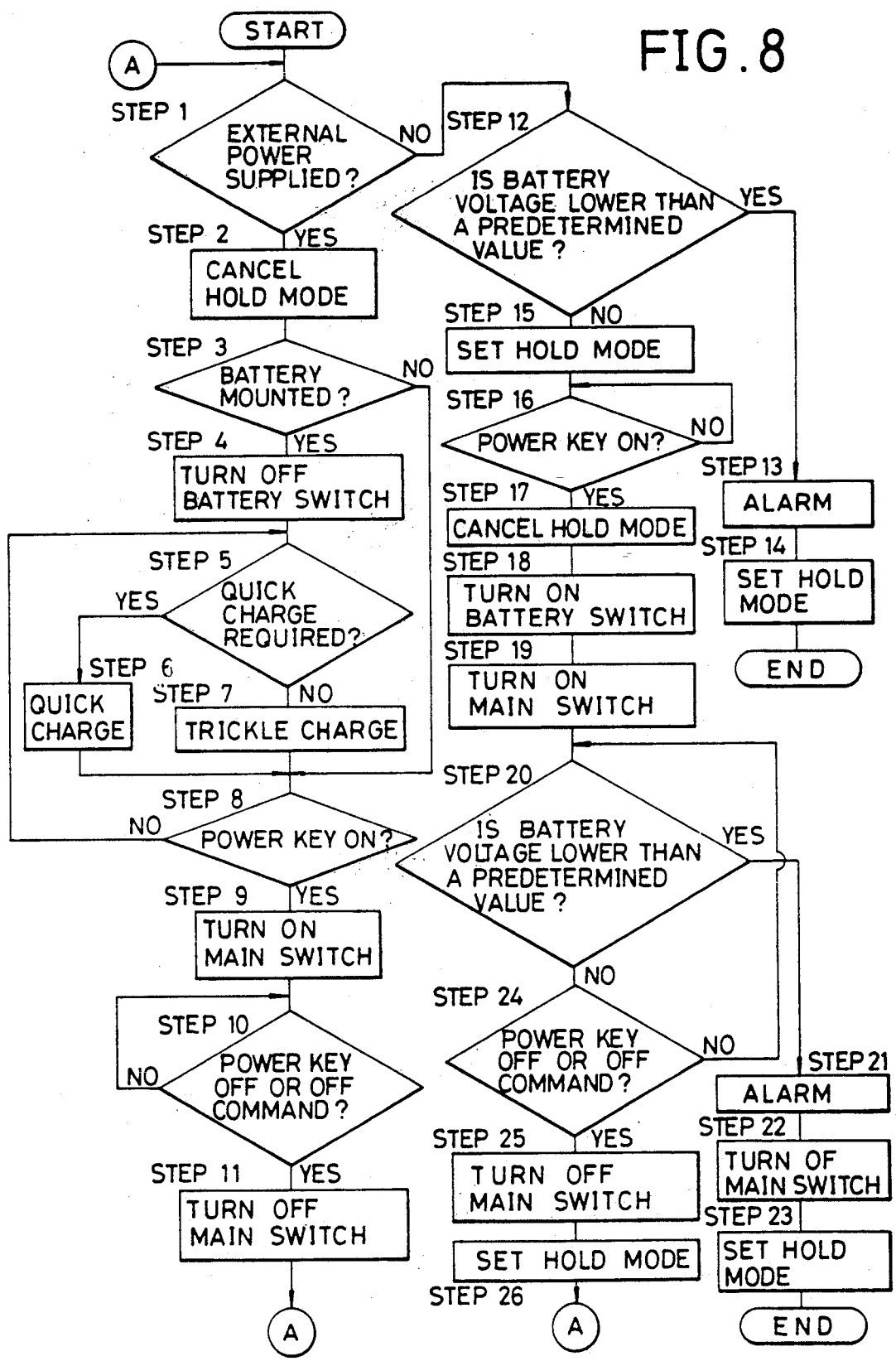
FIG. 8 is a flowchart illustrating a control operation of a power control section shown in FIG. 6.

Now, a second preferred embodiment of the present invention will be described with reference to FIGS. 6 to 8. In this preferred embodiment, the compact battery power source is mounted to a facsimile body of the facsimile equipment. Referring first to FIG. 7 which shows an external appearance of the facsimile equipment, reference numeral 21 designates a facsimile body including a feed mechanism for feeding a transmit document and a recording paper for recording a received data, reading means for reading the transmit document, printing means for printing the received data on the recording paper, and a communication circuit including a modem adapted to be connected to a communication line for effecting transmission and receiving.

There are provided on an upper surface of the facsimile body 21 an insert opening 22 for inserting the transmit document, an insert opening 23 for inserting the recording paper, and an operation panel 24 having various keys and a display. There is further provided, on a front surface of the facsimile body 21, an eject opening 25 for ejecting the transmit document and the recording paper. Further, a cover 26 is openably provided on the upper surface of the facsimile body 21.

Reference numeral 31 designates an AC power source adapter. The adapter 31 is constituted of an adapter body 32, a first cord 33 extending from the adapter body 32 and provided at its free end with a plug 34 adapted to be connected to a plug socket of a commercial AC power source, and a second cord 35 extending from the adapter body 32 and provided at its free end with a plug 36 adapted to be connected to a jack 53 (to be hereinafter described) provided on a rear surface of the facsimile body 21. A power circuit including a transformer is provided in the adapter body 32, so that a commercial AC power is transformed into a DC power in the power circuit, and the DC power is supplied to the facsimile body 21.

In the case of using a DC power source as an external power source, such as a battery mounted in an automobile, the DC power source is connected through a necessary adapter to the facsimile body 21 in the same manner as the case of using the AC power source mentioned above.

Reference numeral 41 designates a rechargeable battery constructed as a battery pack having a case 42 for accommodating a battery body 62 (to be hereinafter described). The rechargeable battery 41 is detachably mounted to a battery mounting recess (not shown) formed on a bottom surface of the facsimile body 21. In mounting the rechargeable battery 41 to the facsimile body 21, a plurality of terminals 43 provided on an upper surface of the case 42 are electrically connected to corresponding terminals provided in the battery mounting recess of the facsimile body 21.

Figure 6:
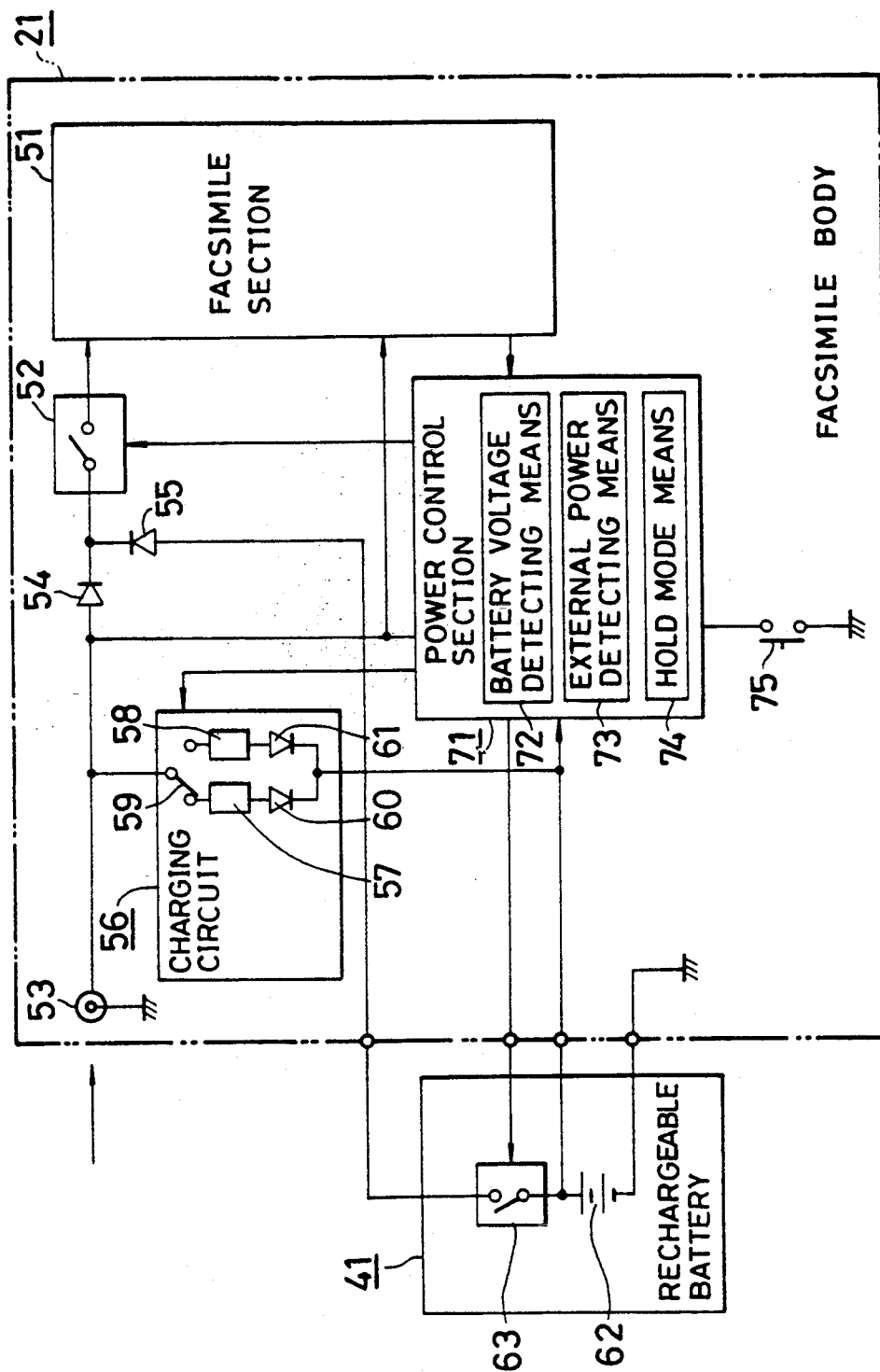
FIG. 6 is a block diagram illustrating an electrical circuit of a facsimile equipment according to a second preferred embodiment of the present invention.

Referring to FIG. 6 which shows a block diagram of an electrical circuit provided in the facsimile body 21. Reference numeral 51 designates a facsimile section for performing transmission and receiving. The facsimile section 51 is turned on and off by a main switch 52 constructed as a relay switch. The jack 53 to be connected with the plug 36 of the AC adapter 31, that is, the AC power source and the rechargeable battery 41 are connected in parallel through diodes 54 and 55, respectively, to the main switch 52.

Reference numeral 56 designates a charging circuit connected at its input terminal to the jack 53 and connected at its output terminal to the rechargeable battery 41. The charging circuit 56 is provided with a quick charging circuit 57 and a trickle charging circuit 58, either of which is selectively connected through a switch 59 to the input terminal, and both are connected through diodes 60 and 61, respectively, to the output terminal.

The battery body 62 of the rechargeable battery 41 is connected in series with a switch 63, which is in turn connected to the main switch 52. The output terminal of the charging circuit 56 is connected to the battery body 62.

Reference numeral 71 designates a power control section. The power control section 71 is adapted to be connected to both the external power source and the rechargeable battery 41 so as to be operated by at least one of these power sources. The power control section 71 has battery voltage detecting means 72 for detecting a voltage supplied from the rechargeable battery 41, external power detecting means 73 for detecting whether or not the external power is supplied to the power control section and thereby detecting whether or not the external power source is connected to the facsimile body 21, and hold mode means 74 for stopping the operation of the power control section 71 to suppress power consumption to a minimum. The power control section 71 controls to turn on and off the main switch 52 according to input operation of a power key 75 provided on the operation panel 24 and power-off command from the facsimile section 51, controls to select the switch 59 of the charging circuit 56, and controls to turn on and off the switch 63 of the rechargeable battery 41.

The control operation of the power control section 71 will now be described with reference to the flow-chart shown in FIG. 8. First, the external power detecting means 73 detects whether or not an external power is supplied to the power control section 71 to thereby determine whether or not the external power source is connected to the facsimile body 21 (step 1).

If the external power source is connected, a hold mode where the operation of the power control section 71 is stopped to suppress power consumption to a minimum is cancelled if this mode is now ON, and thereafter the battery voltage detecting means 72 detects whether or not a battery power is supplied to the power control section 71 to thereby determine whether or not the rechargeable battery 41 is mounted to the facsimile body 21 (steps 2 and 3).

If the rechargeable battery 41 is mounted, the switch 63 of the rechargeable battery 41 is turned off, and the battery voltage detecting means 72 detects a charged condition of the rechargeable battery 41 (steps 4 and 5).

If the charging is required, the switch 59 of the charging circuit 56 is connected to the quick charging circuit 57 to carry out quick charging (step 6). On the other hand, if the rechargeable battery 41 is now in a fully charged condition if it is brought into a fully charged condition by the quick charging, the switch 59 of the charging circuit 56 is connected to the trickle charging circuit 58 to carry out trickle charging (step 7).

Then, if the power key 75 is operated to ON, the main switch 52 is turned on to supply the external power to the facsimile section 51 (steps 8 and 9).

Then, if the power key 75 is operated again to OFF, or a power-off command is input at the end of operation of the facsimile section 51, the main switch 52 is turned off (steps 10 and 11).

Thereafter, the program returns to step 1 and waits for the next operation of the power key 75 at step 8.

If it is determined in step 1 that the external power source is not connected, the battery voltage detecting means 72 detects the charged condition of the rechargeable battery 41 to determine whether or not the battery voltage is lower than a predetermined value (step 12).

If it is determined in step 12 that the battery voltage of the rechargeable battery 41 mounted is lower than the predetermined value, a visual warning is given by lighting or flashing a lamp provided on the facsimile body 21, or an acoustic warning is given by sounding a buzzer or the like (step 13). Furthermore, the hold mode means 74 functions to stop the operation of the power control section 71 and thereby suppress the power consumption to a minimum (step 14). Accordingly, full discharge of the rechargeable battery 41 can be prevented to protect the rechargeable battery 41.

If it is determined in step 12 that the battery voltage is equal to or higher than the predetermined value, the hold mode is set and the operation of the power key 75 is awaited (steps 15 and 16).

If the power key 75 is operated to ON, the hold mode is cancelled; the switch 63 of the rechargeable battery 41 is turned on; and the main switch 52 is turned on to supply the power of the rechargeable battery 41 to the facsimile section 51 (steps 17, 18 and 19).

During the operation of the facsimile section 51, the battery voltage of the rechargeable battery 41 is always detected (step 20).

If the battery voltage of the rechargeable battery 41 becomes lower than the predetermined value during the operation of the facsimile section 51, the warning as mentioned above is given; the main switch 52 is turned off; and the hold mode is set (steps 21, 22 and 23).

If it is determined in step 20 that the battery voltage is equal to or higher than the predetermined value, and if the power key 75 is operated again to OFF or the power-off command is input at the end of the operation of the facsimile section 51, the main switch 52 is turned off and the hold mode is set (steps 24, 25 and 26).

Thereafter, the program returns to step 1 and waits for the next operation of the power key 75.

As described above, a suitable power source can be selected according to whether or not the external power source is connected to the facsimile body 21. Further, in the case that the external power source is connected to the facsimile body 21, the rechargeable battery 41 is reliably charged. Further, when the battery voltage of the rechargeable battery 41 becomes lower than a predetermined value during the operation of the rechargeable battery 41, the power consumption of the rechargeable battery 41 is suppressed to the minimum, so that the rechargeable battery 41 can be protected.

Further, the rechargeable battery 41 is detachable. Accordingly, even when the rechargeable battery 41 mounted becomes dead, it may be replaced by a preparatory rechargeable battery to enable the facsimile equipment to be continuously used.

Thus, whether or not the external power source is connected is detected by the external power detecting means. If the external power source is connected, the facsimile section is operated by the external power, and the rechargeable battery is charged by the charging circuit. On the other hand, if the external power source is not connected, the facsimile section is operated by the power of the rechargeable battery. During the operation of the facsimile section, the battery voltage of the rechargeable battery is detected by the battery voltage detecting means. If the battery voltage becomes lower than a predetermined value, the operation of the facsimile section is stopped. Accordingly, the selection of a suitable power source and the charging of the rechargeable battery can be automatically carried out to thereby eliminate the troublesomeness due to manual selection or the like.

What is claimed is:

1. A portable facsimile equipment having a plurality of power source connecting portions adapted to be selectively connected to plural kinds of power sources, said facsimile equipment being operable in correspondence with the kind of said power source connected, said portable facsimile equipment comprising:
   power source kind detecting means for detecting the kind of said power source connected;
   communication mode storing means for storing a communication mode corresponding to said power source connected;
   communication mode selecting means for accessing said communication mode stored in said communication mode storing means according to a signal from said power source kind detecting means to automatically set said communication mode;
   compact battery means for detachably fixing a compact battery as one of said power sources;
   AC power source means for detachably fixing an AC power source as one of said power sources;
   DC power source means, other than said compact battery means, for detachably fixing a DC power source as one of said power sources;
   wherein when said detecting means detects said AC power source is the power source connected, said communication mode selecting means automatically sets a highest communication speed stored in said communication mode storing means.

2. The portable facsimile equipment according to claim 1, wherein said compact battery means comprises at least one rechargeable battery, and further comprising:
   battery voltage detecting means for detecting a voltage of said at least one rechargeable battery; and
   a charging circuit for charging said at least one rechargeable battery when said AC power source is the power source connected.

3. A portable facsimile equipment having a plurality of power source connecting portions adapted to be selectively connected to plural kinds of power sources, said facsimile equipment being operable in correspondence with the kind of said power source connected, said portable facsimile equipment comprising:
   power source kind detecting means for detecting the kind of said power source connected;
   communication mode storing means for storing a communication mode corresponding to said power source connected;
   communication mode selecting means for accessing said communication mode stored in said communication mode storing means according to a signal from said power source kind detecting means to automatically set said communication mode;
   compact battery means for detachably fixing a compact battery as one of said power sources;
   AC power source means for detachably fixing an AC power source as one of said power sources;
   DC power source means, other than said compact battery means, for detachably fixing a DC power source as one of said power sources;
   wherein when said detecting means detects said DC power source is said kind of power source connected, said communication mode selecting means automatically sets a communication speed lower than that adapted for said AC power source.

4. The portable facsimile equipment according to claim 3, wherein said compact battery means comprises at least one rechargeable battery, and further comprising:
   battery voltage detecting means for detecting a voltage of said at least one rechargeable battery; and
   a charging circuit for charging said at least one rechargeable battery when said AC power source is the power source connected.

5. A portable facsimile equipment having a plurality of power source connecting portions adapted to be selectively connected to plural kinds of power sources, said facsimile equipment being operable in correspondence with the kind of said power source connected, said portable facsimile equipment comprising:
   power source kind detecting means for detecting the kind of said power source connected;
   communication mode storing means for storing a communication mode corresponding to said power source connected;
   communication mode selecting means for accessing said communication mode stored in said communication mode storing means according to a signal from said power source kind detecting means to automatically set said communication mode;
   compact battery means for detachably fixing a compact battery as one of said power sources;
   AC power source means for detachably fixing an AC power source as one of said power sources;
   DC power source means, other than said compact battery means, for detachably fixing a DC power source as one of said power sources;
   wherein when said detecting means detects said DC power source is said kind of power source connected, said communication mode selecting means automatically sets a short break allowable time longer than that adapted for said AC power source.

6. The portable facsimile equipment according to claim 5, wherein said compact battery means comprises at least one rechargeable battery, and further comprising:
- battery voltage detecting means for detecting a voltage of said at least one rechargeable battery; and
- a charging circuit for charging said at least one rechargeable battery when said AC power source is the power source connected.

7. A portable facsimile equipment having a plurality of power source connecting portions adapted to be selectively connected to plural kinds of power sources, said facsimile equipment being operable in correspondence with the kind of said power source connected, said portable facsimile equipment comprising:
- power source kind detecting means for detecting the kind of said power source connected;
- communication mode storing means for storing a communication mode corresponding to said power source connected;
- communication mode selecting means for accessing said communication mode stored in said communication mode storing means according to a signal from said power source kind detecting means to automatically set said communication mode;
- compact battery means for detachably fixing a compact battery as one of said power sources;
- AC power source means for detachably fixing an AC power source as one of said power sources;
- DC power source means other than said compact battery means, for detachably fixing a DC power source as one of said power sources;
- wherein when said detecting means detects said compact battery power source is said kind of power source connected, said communication mode selecting means sets a communication mode such that automatic receiving is inhibited until timer transmission is ended.

8. The portable facsimile equipment according to claim 7, wherein said compact battery means comprises at least one rechargeable battery, and further comprising:
- battery voltage detecting means for detecting a voltage of said at least one rechargeable battery; and
- a charging circuit for charging said at least one rechargeable battery when said AC power source is the power source connected.

* * * * *